(12) United States Patent
Hiroya

(10) Patent No.: US 12,249,320 B2
(45) Date of Patent: Mar. 11, 2025

(54) UTTERANCE EVALUATION APPARATUS, UTTERANCE EVALUATION, AND PROGRAM

(71) Applicant: NIPPON TELEGRAPH AND TELEPHONE CORPORATION, Tokyo (JP)

(72) Inventor: Sadao Hiroya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 457 days.

(21) Appl. No.: 17/622,675

(22) PCT Filed: Jun. 25, 2019

(86) PCT No.: PCT/JP2019/025048
§ 371 (c)(1),
(2) Date: Dec. 23, 2021

(87) PCT Pub. No.: WO2020/261357
PCT Pub. Date: Dec. 30, 2020

(65) Prior Publication Data
US 2022/0366895 A1 Nov. 17, 2022

(51) Int. Cl.
*G10L 21/003* (2013.01)
*G09B 19/06* (2006.01)
(Continued)

(52) U.S. Cl.
CPC .............. *G10L 15/16* (2013.01); *G10L 15/01* (2013.01); *G10L 15/02* (2013.01); *G10L 2015/025* (2013.01)

(58) Field of Classification Search
CPC ......... G10L 15/16; G10L 15/01; G10L 15/02; G10L 2015/025; G10L 21/003;
(Continued)

(56) References Cited

U.S. PATENT DOCUMENTS 8,738,378 B2 * 5/2014 Harada .................... G10L 15/10
704/254
9,195,656 B2 * 11/2015 Fructuoso ............... G10L 13/10
(Continued)

OTHER PUBLICATIONS

Yamashita et al. (2005) "Automatic Scoring for Prosodic Proficiency of English Sentences Spoken by Japanese Based on Utterance Comparison" IEICE transactions on information and systems, vol. E88-D, No. 3, pp. 496-501.

*Primary Examiner* — Pierre Louis Desir
*Assistant Examiner* — Kristen Michelle Masters

(57) ABSTRACT

A stable evaluation result is obtained from a voice of speech for any sentence. A speech evaluation device (1) outputs a score for evaluating speech of an input voice signal spoken by a speaker in a first group. A feature extraction unit (11) extracts an acoustic feature from the input voice signal. A conversion unit (12) converts the acoustic feature of the input voice signal to an acoustic feature when a speaker in a second group speaks the same text as text of the input voice signal. An evaluation unit (13) calculates a score indicating a higher evaluation as a distance between the acoustic feature before the conversion and the acoustic feature after the conversion becomes shorter.

20 Claims, 3 Drawing Sheets

(51) Int. Cl.
    *G10L 15/01*     (2013.01)
    *G10L 15/02*     (2006.01)
    *G10L 15/16*     (2006.01)
    *G10L 25/30*     (2013.01)
    *G10L 25/60*     (2013.01)
    *G10L 25/90*     (2013.01)

(58) Field of Classification Search
    CPC ......... G10L 25/30; G10L 25/90; G10L 25/60; G09B 19/06
    See application file for complete search history.

(56) References Cited

U.S. PATENT DOCUMENTS 9,711,134 B2 *   7/2017   Kuwahara ............. G10L 13/033
  10,410,637 B2 *   9/2019   Paulik .................... G10L 17/04

* cited by examiner

UTTERANCE EVALUATION APPARATUS, UTTERANCE EVALUATION, AND PROGRAM

CROSS-REFERENCE TO RELATED APPLICATIONS

This application is a U.S. National Stage Application filed under 35 U.S.C. § 371 claiming priority to International Patent Application No. PCT/JP2019/025048, filed on 25 Jun. 2019, the disclosure of which is hereby incorporated herein by reference in its entirety.

TECHNICAL FIELD

This invention relates to a technique of evaluating speech of a voice signal.

BACKGROUND ART

In English language speech training for native Japanese-language speakers, a technique of quantifying good and poor speech is important. Speech rhythms and intonation are significantly different between Japanese and English, and it is known that English speech rhythms and intonation as spoken by native Japanese-language speakers are inherently those of Japanese, and thus are less likely to be understood by native English language speakers. For example, Non Patent Literature 1 describes a method for quantifying a speech rhythm and intonation of English spoken by native Japanese-language speakers. According to Non Patent Literature 1, the vocal sound of the same sentence in speech spoken by native Japanese-language speakers and native English-language speakers and scores of speech rhythms and intonation of native Japanese-language speakers evaluated by a native English-language speaker at five levels are used as learning data to make a model for the relationship between syllabic time lengths and scores of native Japanese-language speakers and native English-language speakers to quantify speech rhythms and intonation.

CITATION LIST

Non Patent Literature

Non Patent Literature 1: Yoichi Yamashita, Keisuke Kato, and Kazunori Nozawa, "Automatic Scoring for Prosodic Proficiency of English Sentences Spoken by Japanese Based on Utterance Comparison", IEICE Transactions on Information and Systems, vol. 88(3), pp. 496-501, Mar. 1, 2005.

SUMMARY OF THE INVENTION

Technical Problem

According to Non Patent Literature 1, sentences in speech to be used for evaluation, voices of native English-language speakers speaking the same sentence, and scores of speech evaluated by native English-language speakers to be used for evaluation are required to evaluate speech rhythms and intonation. That is, it is not possible to evaluate speech rhythms and intonation without predetermined sentences. In addition, rather than evaluating whether a speech rhythm or intonation "sounds like those of English", whether voiced speech is close to that of a specific native English-language speaker is evaluated, which is the target of the evaluation, and thus even if voiced speech in English spoken by the same native Japanese-language speaker is input, for example, different evaluation results may be obtained if the speaker aims their speech at a native English-language speaker who has a different speaking speed, or the like, and thus it is not likely to obtain stable results.

An objective of the present invention is to achieve a speech evaluation technique in which stable evaluation results can be obtained from voiced speech obtained by speaking any sentence, taking the above-described technical challenges into account.

Means for Solving the Problem

To solve the above-described problem, a speech evaluation device according to an aspect of this invention includes a feature extraction unit configured to extract an acoustic feature from an input voice signal of speech spoken by a speaker in a first group, a conversion unit configured to convert the acoustic feature of the input voice signal to an acoustic feature when a speaker in a second group speaks the same text as text of the input voice signal, and an evaluation unit configured to calculate a score indicating a higher evaluation as a distance between the acoustic feature before the conversion and the acoustic feature after the conversion becomes shorter.

Effects of the Invention

According to the speech evaluation technique of the present invention, stable evaluation results can be obtained from voiced speech obtained by speaking any sentence.

DESCRIPTION OF EMBODIMENTS

Overview of Invention

Figure 1:
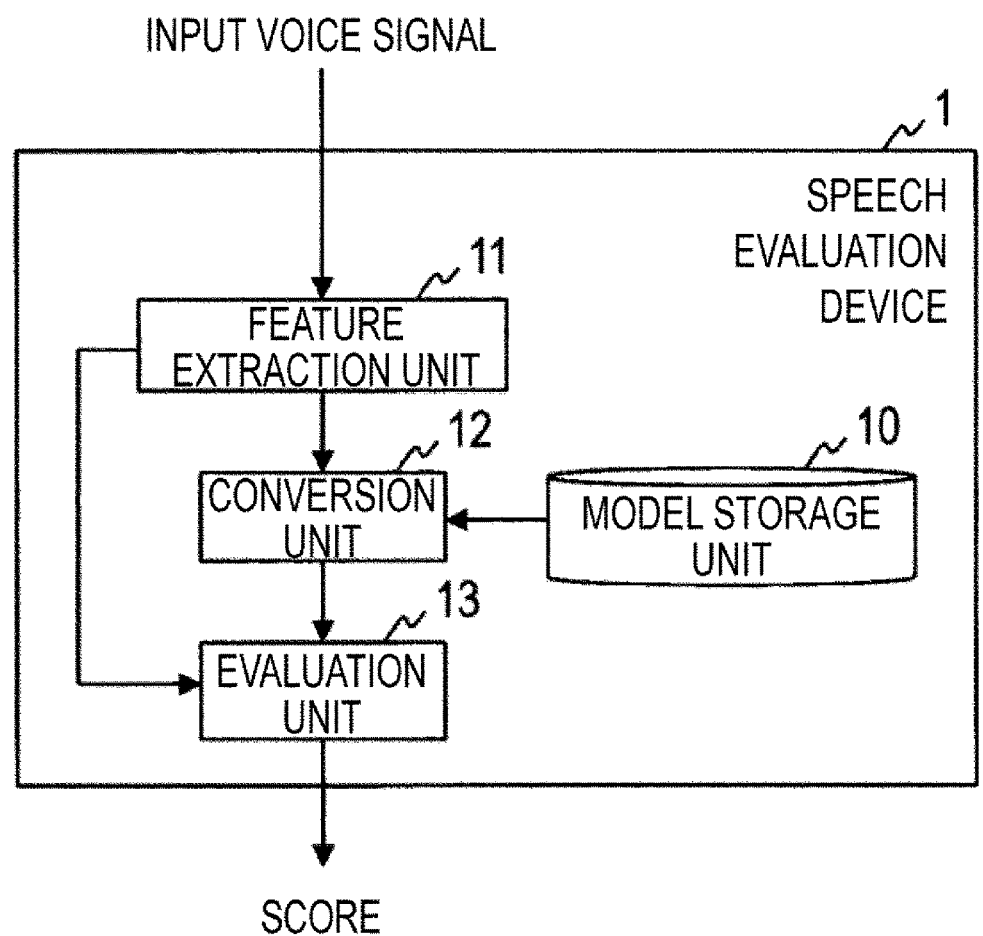
FIG. 1 is a diagram illustrating a functional configuration of a speech evaluation device.

A speech evaluation technique of the present invention solves the problems of the related art using, for example, the speech rhythm conversion technique described in Reference 1 below.

Reference 1: JP 2016-218386 A

Reference 1 is of a technique of converting a speech rhythm of any sentence in English speech spoken by a native Japanese-language speaker to a speech rhythm of a native English-language speaker. It has been found that, using this technique, the speech rhythm in voiced speech in English spoken by a native Japanese-language speaker can be greatly improved, in other words, the speech rhythm in voiced speech in English spoken by the native Japanese-language speaker becomes close to that of a native English-language speaker. On the other hand, it has been found that, in the case in which a speech rhythm in voiced speech in English spoken by a native Japanese-language speaker who is good at speaking English or by a native English-language speaker was set as a conversion target, the speech rhythms before and after the conversion were nearly unchanged. That is, it is possible to evaluate a speech rhythm "sounding like that of English" by designing scores such that a speech rhythm that is nearly unchanged before and after a conversion is evaluated to have a high score and a speech rhythm that is significantly changed is evaluated to have a low score.

According to Reference 1, voiced speech after conversion is not output as specific voiced speech that sounds like a native English-language speaker. However, voiced speech after conversion at a speaking speed of input voiced speech would be output, for example. In other words, the speech evaluation technique of the present invention can solve the problems of the related art that stable evaluation results are not obtained. In addition, because any English sentence can be converted according to Reference 1, the speech evaluation technique of the present invention can resolve the problem of the related art that only predetermined sentences can be evaluated.

EMBODIMENT

Hereinafter, an embodiment of the present invention will be described in detail. Further, the same reference numerals are given to constituent elements having the same functions in the drawings, and repeated description will be omitted.

The embodiment of the present invention includes a speech evaluation device and method for converting a speech rhythm of a voice signal of speech spoken by a speaker in a first group to a speech rhythm of a speaker in a second group and calculating and outputting a score indicating whether the speech rhythm sounds like that of a native speaker based on the speech rhythms before and after the conversion. Here, the first group is, for example, speakers who speak a first language (e.g., Japanese) as a mother tongue (e.g., a native Japanese-language speaker). The second group is, for example, speakers who speak a second language (e.g., English) as a mother tongue (e.g., a native English-language speaker). "Sound like a native speaker" represents the degree to which speaking characteristics of a speaker in the second group in the second language are exhibited.

Figure 2:
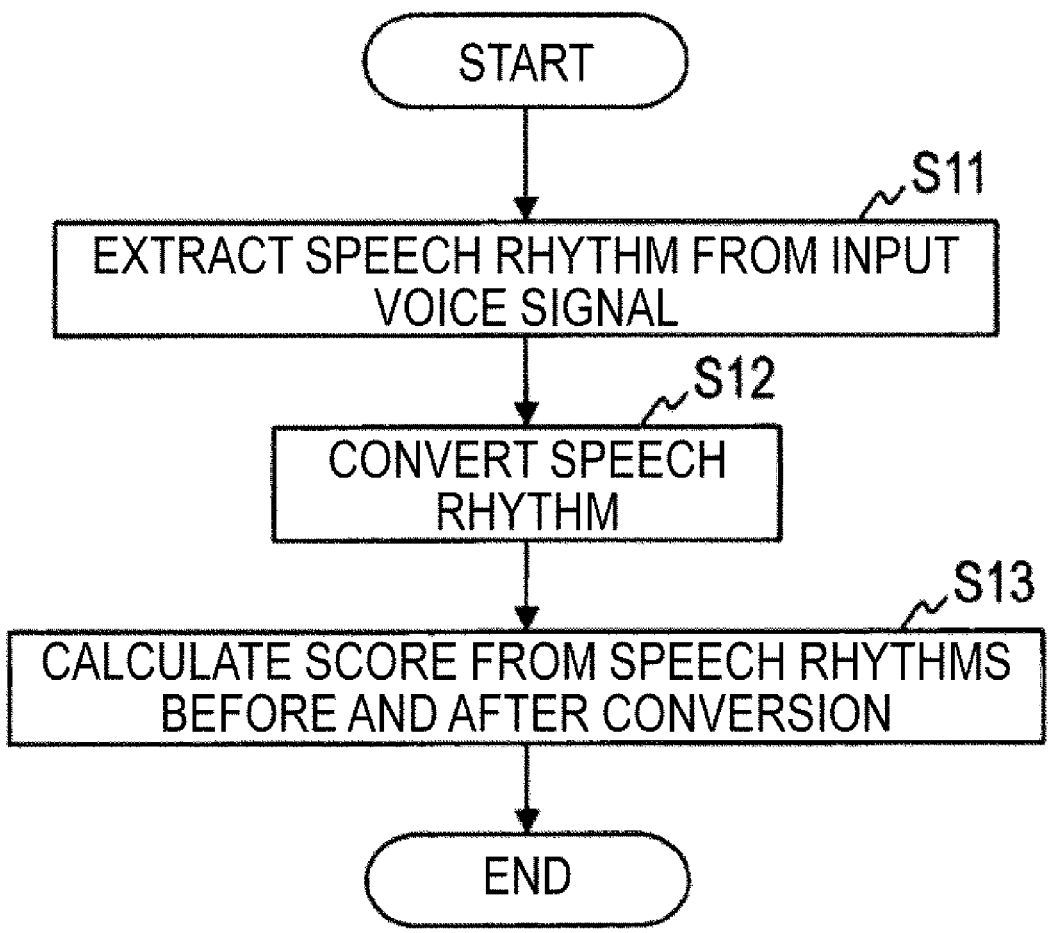
FIG. 2 is a diagram illustrating a processing procedure of a speech evaluation method.

A speech evaluation device 1 according to the embodiment includes a model storage unit 10, a feature extraction unit 11, a conversion unit 12, and an evaluation unit 13 as illustrated in FIG. 1. The speech evaluation method according to the embodiment is realized when the speech evaluation device 1 performs the processing of each step shown in FIG. 2.

The speech evaluation device 1 is a special device configured by causing, for example, a known or dedicated computer including a central processing unit (CPU), a main storage device (a random access memory or RAM), and the like to read a special program. The speech evaluation device 1, for example, executes each processing under control of the central processing unit. Data input to the speech evaluation device 1 and data obtained in each processing are stored in the main storage device, for example, and the data stored in the main storage device is read by the central processing unit as needed to be used for other processing. At least some of processing units of the speech evaluation device 1 may be configured as hardware such as an integrated circuit. Each storage unit included in the speech evaluation device 1 can be configured by, for example, the main storage device such as the random access memory (RAM), an auxiliary storage device configured with a hard disk, an optical disc, or a semiconductor memory element such as a flash memory, or middleware such as a relational database or a key-value store.

The model storage unit 10 stores a speech rhythm conversion model learned in advance (which will also be referred to as an "acoustic feature conversion model" below). The speech rhythm conversion model is a neural network that receives input of a feature vector extracted from a voice signal containing voiced speech spoken by a speaker in the first group to convert the speech rhythm of the speaker in the first group to a speech rhythm of a speaker in the second group and output the conversion result. Hereinafter, a voice signal containing voiced speech spoken by a speaker in the first group in the second language will be referred to as a "first voice signal". In addition, a voice signal containing voiced speech spoken by a speaker in the second group in the second language will be referred to as a "second voice signal". The speech rhythm conversion model is a model learned in advance through deep learning using a set of data (hereinafter referred to as "learning data") containing pairs of first voice signals and second voice signals. The learning data is a sufficient amount of data in which, for example, voice signals of voiced speech spoken in English by native Japanese-language speakers are paired with voice signals of voiced speech in English of the same text spoken by native English-language speakers.

As the neural network, for example, it is only required to use a multilayer perceptron (MLP) constituted by 512 units and five layers, a convolutional neural network (CNN) constituted by five layers and 512 filters, or the like. In a case in which a convolutional neural network is used, it is only required for the filters to be, for example, (10, 2), (8, 1), (6, 1), (3, 1), and (1, 2) in order of input.

The neural network is learned specifically as follows. The learning data is a set of data consisting of pairs of feature vectors including information of speech rhythms extracted from the first voice signals and information of speech rhythms extracted from the second voice signals. The learning data is a sufficient amount of data in which, for example, feature vectors of voice signals of voiced speech in English spoken by native Japanese-language speakers are paired with information of speech rhythms of voice signals of voiced speech of the same text in English spoken by native English-language speakers. A type (an attribute) of a feature included in a feature vector is similar to a feature extracted by the feature extraction unit 11 which will be described below. First, a feature vector of the first voice signal included in the learning data is input to the neural network in which an appropriate initial value is set in advance, and an estimated value of the converted speech rhythm information is obtained. Next, each parameter of the neural network is updated according to a result of comparison between the estimated value of the converted speech rhythm information and the speech rhythm information (correct answer data) of the second voice signal included in the learning data corresponding to the input feature vector. Parameters are only required to be updated using a known error propagation learning method, or the like. For example, parameters are updated (learned) to minimize the mean squared error between the estimated value of the speech rhythm information and the correct answer data. Then, it is determined whether a predetermined end condition is satisfied. If the end condition is satisfied, the learning ends. If the end condition is not satisfied, the conversion of the speech rhythm information and the updating of the parameters are again executed. The predetermined end condition to be used includes that a preset number of repetitions is reached, that an error between an estimated value of the speech rhythm information and the correct answer data is less than or equal to a predetermined threshold value, that an updated amount of parameters is less than or equal to a predetermined threshold value, and the like.

In step S11, the feature extraction unit 11 extracts a feature of each frame from the first voice signal input to the speech evaluation device 1 (hereinafter, referred to as an "input voice signal" below) and generates a feature vector including the feature. The feature extraction unit 11 outputs the extracted feature vector to the conversion unit 12 and the evaluation unit 13.

The feature extracted by the feature extraction unit 11 includes information of a speech rhythm (hereinafter also referred to as "speech rhythm information") $(\Phi_{1, t}, D_{1, t})$. However, $D_{1, t}$ is the duration of a phoneme $p_t$ to be converted, and t is the number of phonemes included in the input voice signal. As a method of obtaining the duration, for example, the method described in paragraphs [0011] to [0027] of Reference 2 can be used. The extracted feature may include, in addition to the speech rhythm information $(\Phi_{1, t}, D_{1, t})$, a known feature related to a voice signal such as a Mel-Frequency Cepstrum Coefficient (MFCC) at an enunciation time of the phoneme $p_t$ (a time at which the phoneme is most expressed), a basic frequency F0, and the like.

[Reference 2] JP 2016-218386A

The feature vector generated by the feature extraction unit 11 is a vector in which features of a predetermined number of consecutive phonemes are arranged. For example, if the features of a phoneme $p_t$ to be converted is $((\Phi_{1, t}, D_{1, t}), MFCC_{1, t}, F0_{1, t})$, the feature vector can represent arranged feature of three consecutive phonemes $p_{t-1}, p_t, p_{t+1}$ $(\Phi_{1, t-1}, \Phi_{1, t}, \Phi_{1, t+1}, D_{1, t-1}, D_{1, t}, D_{1, t+1}, MFCC_{1, t-1}, MFCC_{1, t}, MFCC_{1, t+1}, Flag_{1, t-1}, F0_{1, t-1}, Flag_{1, t}, F0_{1, t}, Flag_{1, t+1}, F0_{1, t+1})^T$. Here, $\bullet^T$ (the superscript T) represents a transposition of a matrix or vector. Flag is information representing being voiced or unvoiced, and for example, 1 is set for being voiced and 0 is set for being unvoiced.

The feature extraction unit 11 extracts feature vectors consisting of the elements shown in Table 1, for example. In Table 1, the first stage represents the type of element (attribute), the second stage represents the number of phonemes from which the elements have been extracted, and the third stage represents the order of the elements.

(CNN), a 24×3 matrix including the 24th-order vectors for the previous phoneme $p_{t-1}$ $(\Phi_{1, t-1}, D_{1, t-1}, MFCC_{1, t-1}, Flag_{1, t-1}, F0_{1, t-1})^T$, the 24th-order vectors for the current phoneme $p_t$ $(\Phi_{1, t}, D_{1, t}, MFCC_{1, t}, Flag_{1, t}, F0_{1, t})^T$, and the 24th-order vectors for the next phoneme $p_{t+1}$ $(\Phi_{1, t+1}, D_{1, t+1}, MFCC_{1, t+1}, Flag_{1, t+1}, F0_{1, t+1})^T$ are input to the conversion unit 12.

In step S12, the conversion unit 12 receives the feature vector of the input voice signal from the feature extraction unit 11, and inputs the feature vector to the speech rhythm conversion model stored in the model storage unit 10. Then, the conversion unit 12 obtains converted speech rhythm information $(\Phi_{2, t}, D_{2, t})$ obtained by converting the speech rhythm of the input voice signal to a speech rhythm of a speaker in the second group. However, $D_{2, t}$ represents the duration of a phoneme after conversion. The conversion unit 12 outputs the obtained duration $D_{2, t}$ after the conversion to the evaluation unit 13.

The conversion unit 12 outputs a 21st-order vector consisting of the elements shown in Table 2, for example, on the assumption that $\Phi D_E$ is a sampling result of the sampled time function of native English-language speakers to have 20 points when the above-described 72nd-order feature vector is received as input.

TABLE 2

| $\Phi_E$ | $D_E$ | Flag | F0 |
|---|---|---|---|
| t | t | t | t |
| 18TH ORDER | 1ST ORDER | 1ST ORDER | 1ST ORDER |

In step S13, the evaluation unit 13 calculates a score representing the speech rhythm "sounding like that of a native speaker" from the duration $D_{1, t}$ before the conversion generated by the feature extraction unit 11 and the duration $D_{2, t}$ after the conversion generated by the conversion unit 12 and outputs the score. The score is calculated based on the distance between the duration $D_{1, t}$ before the conversion and

TABLE 1

| $\Phi_J$ | $\Phi_J$ | $\Phi_J$ | $D_J$ | $D_J$ | $D_J$ | MFCC | MFCC | MFCC | Flag | F0 | Flag | F0 | Flag | F0 |
|---|---|---|---|---|---|---|---|---|---|---|---|---|---|---|
| t − 1 | t | t + 1 | t − 1 | t | t + 1 | t − 1 | t | t + 1 | t − 1 | t − 1 | t | t | t + 1 | t + 1 |
| 8TH ORDER | 8TH ORDER | 8TH ORDER | 1ST ORDER | 1ST ORDER | 1ST ORDER | 13TH ORDER | 13TH ORDER | 13TH ORDER | 1ST ORDER | 1ST ORDER | 1ST ORDER | 1ST ORDER | 1ST ORDER | 1ST ORDER |

$\Phi_J$ is assumed to be a sampling result of a sampled time function of native Japanese-language speakers to have 10 points. However, the values of $\Phi_J$ in the 1st order and 10th order (final order) are 0.5 at all times and thus are excluded from the feature vectors. $D_J$ is the duration of a phoneme. MFCC is a Mel cepstrum frequency extracted from a voice signal used in voice recognition and the like, and is analyzed in the 13th order, and it is assumed that the 13th order except for the zero-th order term (gain) is used. It is assumed that F0 complements the value for being unvoiced, logs to Hz, and subtracts the average value to normalize. Flag is assumed to represent flag information of 1 for being voiced and 0 for being unvoiced. In this example, the feature vector for the input voice signal is a 72nd-order vector.

If the speech rhythm conversion model is configured as a multilayer perceptron (MLP), the 72nd-order vector is input to the conversion unit 12. If the speech rhythm conversion model is configured as a convolutional neural network the duration $D_{2, t}$ after the conversion. The score is a value, for example, from 0 points to 100 points, and a higher value represents a higher evaluation.

A short distance between the duration $D_{1, t}$ before the conversion and the duration $D_{2, t}$ after the conversion means that the speech rhythm of the input voice signal is close to an original speech rhythm of a speaker in the second group. On the other hand, a long distance between the duration $D_{1, t}$ before the conversion and the duration $D_{2, t}$ after the conversion means that the speech rhythm of the input voice signal is different from a speech rhythm of a speaker in the second group. That is, the scores may be designed to indicate that an evaluation becomes higher as a distance between the duration $D_{1, t}$ before the conversion and the duration $D_{2, t}$ after the conversion gets closer. Specifically, a score out of the maximum 100 points can be obtained by performing calculation with the formula (1).

[Math. 1]

$$\frac{100 \times M}{\sum_{t=1}^{K} |D_{1,t} - D_{2,t}|} \quad (1)$$

Where K represents the number of phonemes in an input voice signal, and M represents the minimum value of formula (2) when a second voice signal (e.g., voiced speech spoken in English by a native English-language speaker) is input.

[Math. 2]

$$\sum_{t=1}^{K} |D_{1,t} - D_{2,t}| \quad (2)$$

Basically, a score does not exceed 100 points because a value of formula (2) when the first voice signal (e.g., voiced speech spoken in English by a native Japanese-language speaker) is input does not fall below a value of M. If a value of formula (1) does not fall within the range from 0 to 100, it is only required to clip the range with a lower limit of 0 and an upper limit of 100.

First Modified Example

If there is a score determined by a speaker in the second group by evaluating a speech rhythm of an input voice signal at five levels, the value of formula (1) can be converted to the score to evaluate "being closer to a human". To convert the value of formula (1) to the score, a common conversion technique such as linear regression, neural network, or the like can be used.

Second Modified Example

The conversion unit 12 of the embodiment converts the speech rhythm information using the speech rhythm conversion model configured as a neural network. However, a speech rhythm conversion method is not limited to this method, and other techniques may be used to convert a speech rhythm of speech spoken by a speaker in the first group to the speech rhythm of speech spoken by a speaker in the second group. For example, the speech rhythm conversion technique disclosed in Reference 2 described above can be used to convert speech rhythms as follows.

A speech rhythm conversion model according to a second modified example is a Gaussian mixture model representing a speech rhythm conversion rule vectors learned from speech rhythm information extracted from first voice signals and speech rhythm information extracted from second voice signals. Here, the first voice signals are voice signals of voiced speech spoken by speakers in the first group. In addition, the second voice signals are voice signals of voiced speech spoken by speakers of the second group. Hereinafter, the speech rhythm conversion rule vector is also referred to as an "acoustic feature conversion rule vector". The speech rhythm information includes at least the duration of a phoneme, as in the embodiment. It is advised to refer to paragraphs [0027] to [0032] of Reference 2 for details of the learning method for the speech rhythm conversion rule vector.

The conversion unit 12 of the second modified example converts speech rhythm information using a speech rhythm conversion model configured as a Gaussian mixture model. First, the conversion unit 12 uses a Gaussian mixture model of the dimension corresponding to a first speech rhythm of the Gaussian mixture model as a first Gaussian mixture model to obtain a weight of the first Gaussian mixture model such that the first Gaussian mixture model applies best to the speech rhythm information extracted from the input speech signal. Next, the conversion unit 12 uses a Gaussian mixture model of the dimension corresponding to a second speech rhythm in the Gaussian mixture model as a second Gaussian mixture model to obtain converted speech rhythm information by using weights to perform weighted addition on the mean of a Gaussian distribution constituting the Gaussian mixture model of each dimension in a second Gaussian mixture distribution. The conversion unit 12 outputs the duration $D_{2,t}$ of a converted phoneme included in the converted speech rhythm information to the evaluation unit 13. It is advised to refer to paragraphs [0038] to [0046] of Reference 2 for details of the speech rhythm conversion method.

Other Applications

It is possible to increase accuracy in evaluation of a speech rhythm by having formula (1) of which D is substituted with a time function Φ as formula (3) and adding formula (1) to formula (3). The idea that speech is evaluated through conversion can also be applied to other features of voiced speech such as intonation, accents, pronunciations, and the like, in addition to speech rhythms. For example, in a case in which an intonation or an accent is to be evaluated, it is only required to replace a value of F0 before and after conversion with D of formula (1).

The speech evaluation technique can be used to train speech rhythms. For example, a native Japanese-language speaker voices any English sentence in speech, and the voice with the converted speech rhythm and the score of the speech rhythm are presented to the speaker. Then, if the speaker imitates the converted speech, his or her scores are expected to be gradually improved. To make this training more effective, the distance between phonemes may be visually displayed.

As a method of obtaining the duration, in addition to the method described in paragraphs [0011] to [0027] of Reference 2, a method using phonemic labeling of voice waveforms for human eyes and ears, or a method using automated phonemic labeling may be used. In addition, although the durations of the phonemes are used in the example of formula (1), durations of syllables and words may be used.

Although the embodiments of the present invention have been described above, a specific configuration is not limited to the embodiments, and appropriate changes in the design are, of course, included in the present invention within the scope of the present invention without departing from the gist of the present invention. The various kinds of processing described in the embodiments are not only executed in the described order in a time-series manner but may also be executed in parallel or separately as necessary or in accordance with a processing capability of the device that performs the processing.

Program and Recording Medium

Figure 3:
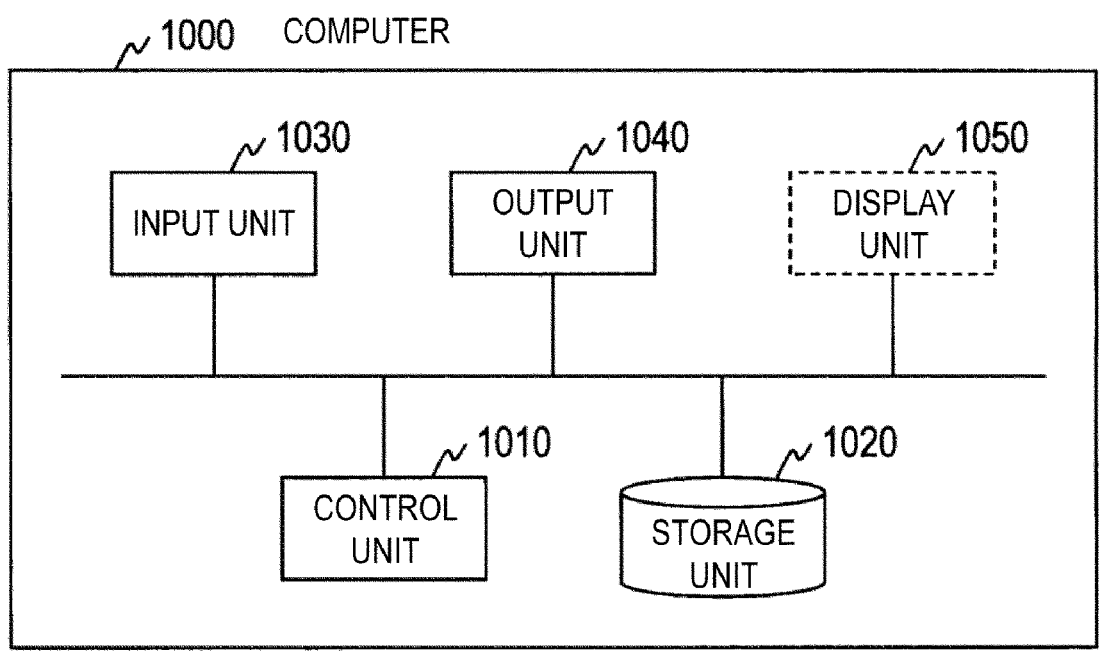
FIG. 3 is a diagram illustrating a functional configuration of a computer.

In a case in which various processing functions in each device described in the foregoing embodiment are implemented by a computer, processing details of the functions that each device should have are described by a program. By causing this program to be read into a storage unit 1020 of the computer illustrated in FIG. 3 and causing a control unit 1010, an input unit 1030, an output unit 1040, and the like to operate, various processing functions of each of the devices described above are implemented on the computer.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration to execute the processing through a so-called application service provider (ASP) service in which processing functions are implemented just by issuing an instruction to execute the program and obtaining results without transmitting the program from the server computer to the computer. Further, the program in this mode is assumed to include information which is provided for processing of a computer and is equivalent to a program (data or the like that has characteristics of regulating processing of the computer rather than being a direct instruction to the computer).

In addition, although the device is configured to execute a predetermined program on a computer in this mode, at least a part of the processing details may be implemented by hardware.

The invention claimed is:

1. A speech evaluation device comprising circuitry configured to execute a method comprising:
   extracting an acoustic feature from an input voice signal of speech spoken by a speaker in a first group;
   converting using a neural network, the acoustic feature of the input voice signal to an acoustic feature when a speaker in a second group speaks the same text as text of the input voice signal; and
   determining a score indicating a higher evaluation as a distance between the acoustic feature before the conversion and the acoustic feature after the conversion becomes shorter, wherein
   the neural network obtains an estimated value of a converted speech rhythm using the input voice signal and updates a plurality of parameters of the neural network based on a comparison result between the estimated value of the converted speech rhythm and speech rhythm information in a learning data,
   storing a Gaussian mixture model representing an acoustic feature conversion rule vector learned from a first acoustic feature extracted from a first voice signal of speech spoken by a speaker in the first group and a second acoustic feature extracted from a second voice signal of speech spoken by a speaker in the second group; and
   obtaining, by using a Gaussian mixture model of a dimension corresponding to the first acoustic feature as a first Gaussian mixture model, a weight of the first Gaussian mixture model such that the first Gaussian mixture model applies best to the acoustic feature extracted from the input voice signal.

2. The speech evaluation device according to claim 1, wherein the acoustic feature at least includes a duration of a phoneme, and
   the score indicates a higher evaluation as a distance between the duration before the conversion and the duration after the conversion becomes shorter.

3. The speech evaluation device according to claim 1, wherein the acoustic feature at least includes a basic frequency of a phoneme, and
   the score indicates a higher evaluation as a distance between the basic frequency before the conversion and the basic frequency after the conversion becomes shorter.

4. The speech evaluation device according to claim 1, wherein the score is indicated by a value from 0 to 100 points, and a higher value represents a higher evaluation.

5. The speech evaluation device according to claim 1, the circuitry further configured to execute a method comprising:
   obtaining, by using a Gaussian mixture model of a dimension corresponding to the second acoustic feature as a second Gaussian mixture model, the acoustic feature after the conversion by using the weight to perform weighted addition on a mean of a Gaussian distribution forming a Gaussian mixture model of a dimension in a second Gaussian mixture distribution.

6. The speech evaluation device according to claim 1, the circuitry further configured to execute a method comprising:
   storing an acoustic feature conversion model that is a neural network configured to receive an acoustic feature extracted from a first voice signal of speech spoken by a speaker in the first group as input, the neural network being configured to convert the acoustic feature of the first voice signal into an acoustic feature when a speaker in the second group speaks a same text as text of the first voice signal, and output the acoustic feature; and
   inputting an acoustic feature extracted from the input voice signal to the acoustic feature conversion model to obtain the acoustic feature after the conversion.

7. A computer-implemented method for evaluating speech, the method comprising:
   extracting, an acoustic feature from an input voice signal of speech spoken by a speaker in a first group;
   converting, using a neural network, the acoustic feature of the input voice signal to an acoustic feature when a speaker in a second group speaks a same text as text of the input voice signal; and
   calculating, a score indicating a higher evaluation as a distance between the acoustic feature before the conversion and the acoustic feature after the conversion becomes shorter, wherein
   the neural network obtains an estimated value of a converted speech rhythm using the input voice signal and updates a plurality of parameters of the neural network based on a comparison result between the estimated value of the converted speech rhythm and speech rhythm information in a learning data, storing a Gaussian mixture model representing an acoustic feature conversion rule vector learned from a first acoustic feature extracted from a first voice signal of speech spoken by a speaker in the first group and a second acoustic feature extracted from a second voice signal of speech spoken by a speaker in the second group;

obtaining, by using a Gaussian mixture model of a dimension corresponding to the first acoustic feature as a first Gaussian mixture model, a weight of the first Gaussian mixture model such that the first Gaussian mixture model applies best to the acoustic feature extracted from the input voice signal.

8. A computer-readable non-transitory recording medium storing computer-executable program instructions that when executed by a processor cause a computer system to execute a method comprising:

extracting an acoustic feature from an input voice signal of speech spoken by a speaker in a first group;

converting using a neural network, the acoustic feature of the input voice signal to an acoustic feature when a speaker in a second group speaks the same text as text of the input voice signal; and determining a score indicating a higher evaluation as a distance between the acoustic feature before the conversion and the acoustic feature after the conversion becomes shorter, wherein the neural network obtains an estimated value of a converted speech rhythm using the input voice signal and updates a plurality of parameters of the neural network based on a comparison result between the estimated value of the converted speech rhythm and speech rhythm information in a learning data, storing a Gaussian mixture model representing an acoustic feature conversion rule vector learned from a first acoustic feature extracted from a first voice signal of speech spoken by a speaker in the first group and a second acoustic feature extracted from a second voice signal of speech spoken by a speaker in the second group;

obtaining, by using a Gaussian mixture model of a dimension corresponding to the first acoustic feature as a first Gaussian mixture model, a weight of the first Gaussian mixture model such that the first Gaussian mixture model applies best to the acoustic feature extracted from the input voice signal.

9. The speech evaluation device according to claim 2, wherein the score is indicated by a value from 0 to 100 points, and a higher value represents a higher evaluation.

10. The computer-implemented method according to claim 7, wherein the acoustic feature at least includes a duration of a phoneme, and the score indicates a higher evaluation as a distance between the duration before the conversion and the duration after the conversion becomes shorter.

11. The computer-implemented method according to claim 7, wherein the acoustic feature at least includes a basic frequency of a phoneme, and the score indicates a higher evaluation as a distance between the basic frequency before the conversion and the basic frequency after the conversion becomes shorter.

12. The computer-implemented method according to claim 7, wherein the score is indicated by a value from 0 to 100 points, and a higher value represents a higher evaluation.

13. The computer-implemented method according to claim 7, the method further comprising:

obtaining, by using a Gaussian mixture model of a dimension corresponding to the second acoustic feature as a second Gaussian mixture model, the acoustic feature after the conversion by using the weight to perform weighted addition on a mean of a Gaussian distribution forming a Gaussian mixture model of a dimension in a second Gaussian mixture distribution.

14. The computer-implemented method according to claim 7, the method further comprising:

storing an acoustic feature conversion model that is a neural network configured to receive an acoustic feature extracted from a first voice signal of speech spoken by a speaker in the first group as input, the neural network being configured to convert the acoustic feature of the first voice signal into an acoustic feature when a speaker in the second group speaks a same text as text of the first voice signal, and output the acoustic feature; and inputting an acoustic feature extracted from the input voice signal to the acoustic feature conversion model to obtain the acoustic feature after the conversion.

15. The computer-implemented method according to claim 10, the method further comprising:

storing a Gaussian mixture model representing an acoustic feature conversion rule vector learned from a first acoustic feature extracted from a first voice signal of speech spoken by a speaker in the first group and a second acoustic feature extracted from a second voice signal of speech spoken by a speaker in the second group;

obtaining, by using a Gaussian mixture model of a dimension corresponding to the first acoustic feature as a first Gaussian mixture model, a weight of the first Gaussian mixture model such that the first Gaussian mixture model applies best to the acoustic feature extracted from the input voice signal; and obtaining, by using a Gaussian mixture model of a dimension corresponding to the second acoustic feature as a second Gaussian mixture model, the acoustic feature after the conversion by using the weight to perform weighted addition on a mean of a Gaussian distribution forming a Gaussian mixture model of a dimension in a second Gaussian mixture distribution.

16. The computer-readable non-transitory recording medium according to claim 8, wherein the acoustic feature at least includes a duration of a phoneme, and the score indicates a higher evaluation as a distance between the duration before the conversion and the duration after the conversion becomes shorter.

17. The computer-readable non-transitory recording medium according to claim 8, wherein the acoustic feature at least includes a basic frequency of a phoneme, and the score indicates a higher evaluation as a distance between the basic frequency before the conversion and the basic frequency after the conversion becomes shorter.

18. The computer-readable non-transitory recording medium according to claim 8,
wherein the score is indicated by a value from 0 to 100 points, and a higher value represents a higher evaluation.

19. The computer-readable non-transitory recording medium according to claim 8, the computer-executable program instructions when executed further causing the computer system to execute a method comprising:
obtaining, by using a Gaussian mixture model of a dimension corresponding to the second acoustic feature as a second Gaussian mixture model, the acoustic feature after the conversion by using the weight to perform weighted addition on a mean of a Gaussian distribution forming a Gaussian mixture model of a dimension in a second Gaussian mixture distribution.

20. The computer-readable non-transitory recording medium according to claim 8, the computer-executable program instructions when executed further causing the computer system to execute a method comprising:
storing an acoustic feature conversion model that is a neural network configured to receive an acoustic feature extracted from a first voice signal of speech spoken by a speaker in the first group as input, the neural network being configured to convert the acoustic feature of the first voice signal into an acoustic feature when a speaker in the second group speaks a same text as text of the first voice signal, and output the acoustic feature; and
inputting an acoustic feature extracted from the input voice signal to the acoustic feature conversion model to obtain the acoustic feature after the conversion.

* * * * *